C. C. BOWEN & J. A. COFFEY.
COLLAPSIBLE FOLDING BOX.
APPLICATION FILED FEB. 18, 1909.
934,273.
Patented Sept. 14, 1909.
2 SHEETS—SHEET 1.
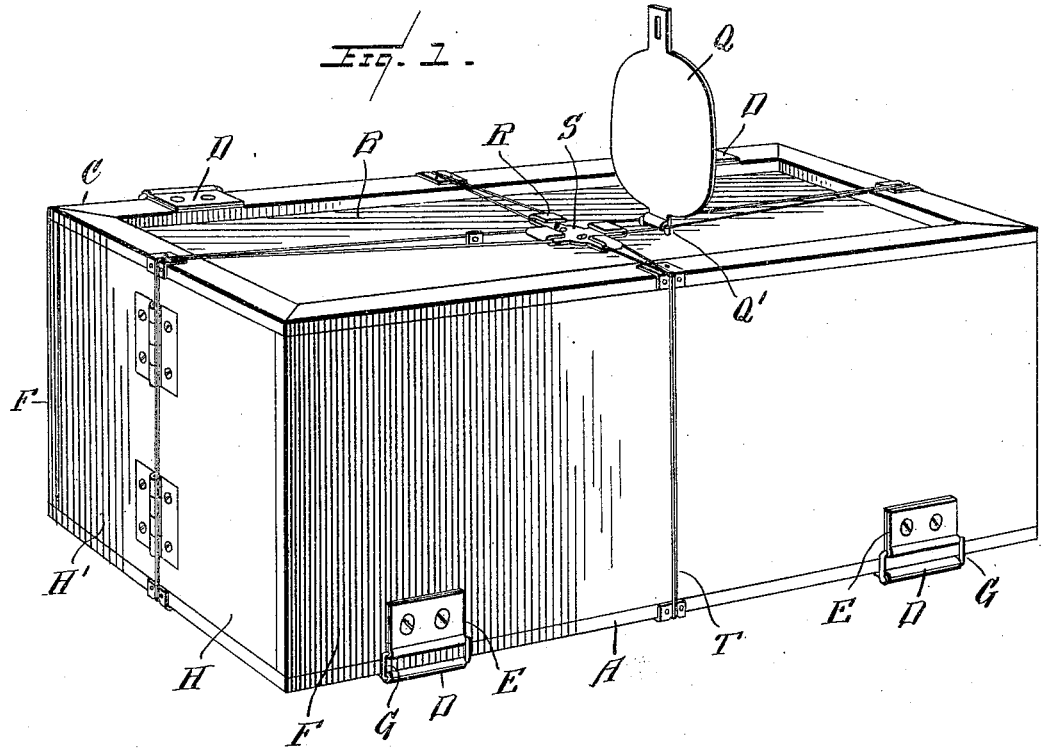
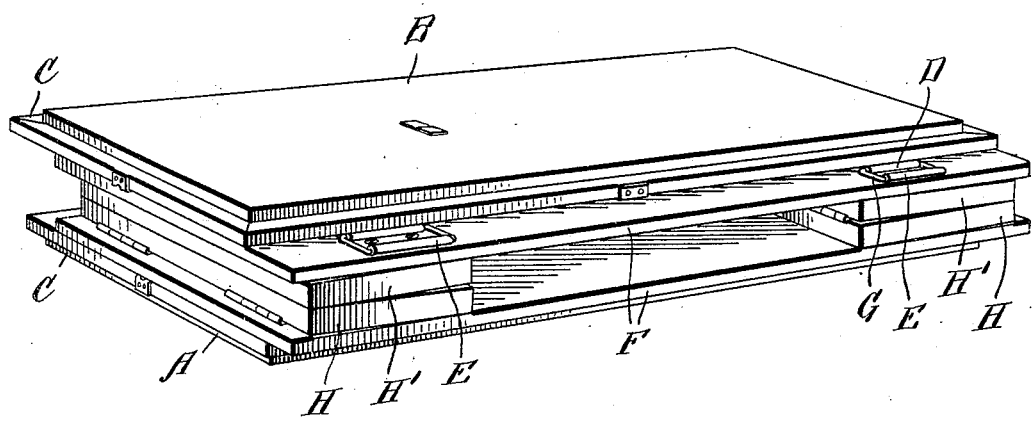
WITNESSES:
INVENTORS
John R. Coffey and C. C. Bowen,
BY Franklin H. Hough
Attorney C. C. BOWEN & J. A. COFFEY.
COLLAPSIBLE FOLDING BOX.
APPLICATION FILED FEB. 18, 1909.
934,273.
Patented Sept. 14, 1909.
2 SHEETS—SHEET 2.
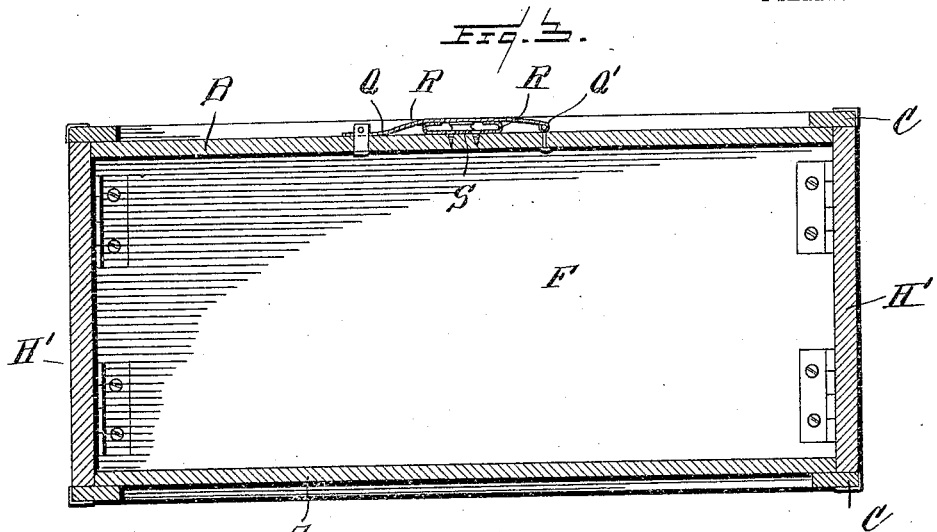
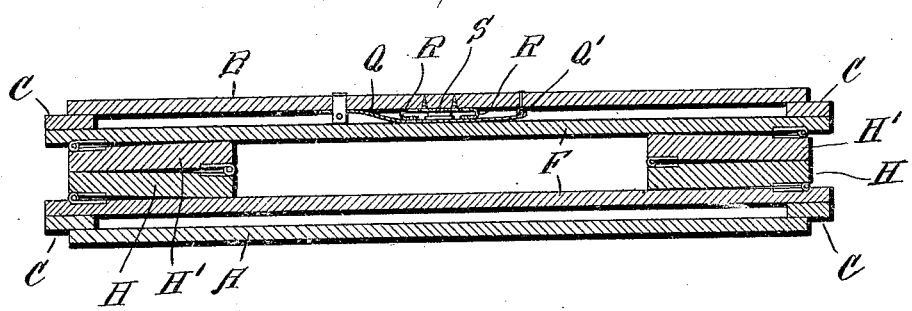
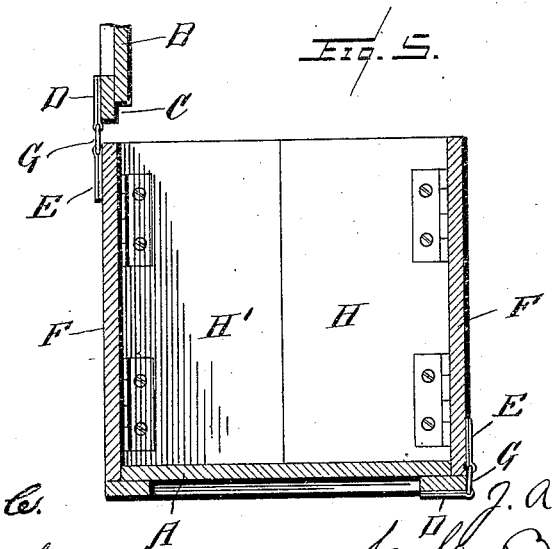

UNITED STATES PATENT OFFICE.

CLARENCE CHARLES BOWEN AND JOHN A. COFFEY, OF CADILLAC, MICHIGAN.

COLLAPSIBLE FOLDING BOX.

934,273.

Specification of Letters Patent. Patented Sept. 14, 1909.

Application filed February 18, 1909. Serial No. 478,720.

*To all whom it may concern:*

Be it known that we, CLARENCE C. BOWEN and JOHN A. COFFEY, citizens of the United States, residing at Cadillac, in the county of Wexford and State of Michigan, have invented certain new and useful Improvements in Collapsible Folding Boxes; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in collapsible folding boxes adapted for shipping different kinds of ingredients and comprises various details of construction, combinations and arrangements of parts which will be hereinafter fully described and then specifically defined in the appended claim.

We illustrate our invention in the accompanying drawings, in which:—

Figure 1 is a perspective view showing the box open ready for use. Fig. 2 is a similar view showing the box folded. Fig 3 is a cross sectional view through the box open. Fig. 4 is a cross sectional view of the box folded, and Fig. 5 is a sectional view showing the cover open and the manner of hinging the same to one side of the box.

Reference now being had to the details of the drawings by letter, A designates the bottom of the box and B the top which are substantially of similar construction, each having a flange C about its entire marginal edges. The top and bottom is each provided with a leaf hinge D and similar leaf hinges E are fastened to the sides F.

G designates wire links, substantially rectangular in shape, and the opposite sides of said links are pivotally connected one to each of the leaf hinges upon the bottom and side of the box or upon the side and top. Said top and bottom are preferably hinged diametrically opposite each other.

The ends of the box are made up each of two sections, designated respectively by letters H and H', and hinged together at their inner ends and adapted to fold inward so that the outer faces of the two sections will be in contact with each other, while the outer edges of each section are hinged to the inner faces of each of the sides, preferably at such locations that, when the ends are opened out with their opposite faces flush, the outer faces of each section will be flush with the ends of the sides.

In order to reinforce the box, the ends are preferably of thicker material than the sides and the flanges at the ends of the top and bottom are correspondingly somewhat wider than the flanges upon the longitudinal edges of the top and bottom, each flange being of sufficient width to receive the end or side of the box in the manner shown in Fig. 1 of the drawings.

When the box is opened out for use, the portion of the top and bottom inside of the flange about the same is adapted to engage the inner faces of the sections forming the end of the box and also the inner face of the sides, thereby holding the ends from folding while the opposite sides are prevented from being moved toward each other, thereby protecting the contents of the box. The top and bottom of the box being hinged as shown will allow the same to swing over so that the cover, excepting the flange, will enter the opening intermediate the walls and ends of the box while the flange rests upon the edges of the sides and end sections.

In order to hold the box either in a folded or closed relation, a wire T may be passed about the sides and ends of the box and caught about the fingers R upon the plate S' and a lid or cover Q hinged at Q' to the top is adapted to cover said fingers and has a latch whereby it may be locked over the ends, thus preventing any tampering with the connected ends of the wire.

From the foregoing, it will be noted that, by the provision of a collapsible box as shown and described, means is afforded whereby the box when not in use may be reduced to a compact form for economy in space, shipping, etc. When the box is opened up in readiness for use and closed, the sides are reinforced and the ends held from collapsing by the construction shown and described.

What we claim to be new is:—

A collapsible box comprising side walls, ends made up of hinged sections, each of which is hinged to one of said side walls, the outer faces of the sections of the end being flush with the ends of the side walls, a top and bottom to said boxing, each having a rabbeted portion about the entire marginal edges thereof adapted to receive the edges of the sides and the sectional ends of the box, straps fastened to the outer faces of the sides of the box and to the outer faces of the top and bottom, and rectangular outlined loops having parallel portions thereof journaled in roller apertured portions of the straps and bearing against the opposite edges of the top and bottom, as shown and described.

In testimony whereof we hereunto affix our signatures in the presence of two witnesses.

CLARENCE CHARLES BOWEN.
JOHN A. COFFEY.

Witnesses:
  OTTO L. RICKER,
  EMMETT I. BOWEN.